(12) United States Patent
Kato

(10) Patent No.: US 7,230,775 B2
(45) Date of Patent: Jun. 12, 2007

(54) ELECTRONIC IMAGING SYSTEM

(75) Inventor: Shigeru Kato, Tachikawa (JP)

(73) Assignee: Olympus Corporation, Tokyo (JP)

( * ) Notice: Subject to any disclaimer, the term of this patent is extended or adjusted under 35 U.S.C. 154(b) by 955 days.

(21) Appl. No.: 10/417,131

(22) Filed: Apr. 17, 2003

(65) Prior Publication Data

US 2003/0197802 A1    Oct. 23, 2003

(30) Foreign Application Priority Data

Feb. 21, 2003    (JP)    ............................. 2002-117777

(51) Int. Cl.
*G02B 13/04* (2006.01)
(52) U.S. Cl. ...................... 359/745; 359/781; 359/784
(58) Field of Classification Search ........ 359/738–740, 359/745, 754–757, 763–764, 771–772, 781, 359/784–787, 793–794
See application file for complete search history.

(56) References Cited

U.S. PATENT DOCUMENTS

| 4,260,223 A | * | 4/1981 | Hamanishi | ................... 359/740 |
| 4,395,094 A | * | 7/1983 | Hamanishi | ................... 359/768 |
| 4,784,480 A | * | 11/1988 | Yokota et al. | ............... 359/776 |
| 2002/0041451 A1 | * | 4/2002 | Harada | ........................ 359/745 |

* cited by examiner

*Primary Examiner*—Scott J. Sugarman
*Assistant Examiner*—DaWayne Pinkney
(74) *Attorney, Agent, or Firm*—Kenyon & Kenyon LLP

(57) ABSTRACT

The invention relates to an electronic imaging system wherein an image pickup device is horizontally located while ensuring the space for a reflective member thereby achieving height, length and cost reductions. The imaging system comprises a taking lens and an image pickup device. The taking lens comprises a front lens group G1 consisting of a negative lens component and a positive lens component and having positive refracting power and a rear lens group G2 consisting of a negative lens element and a positive lens element and having positive refracting power, with an aperture stop S interposed between the front lens group G1 and the rear lens group G2. The taking lens satisfies conditions (1) and (2).

$$2.8 < f_B/IH < 4.5 \quad (1)$$

$$2 < SF < 3 \quad (2)$$

Here $f_B$ is back focus of the taking lens, IH is a length that is half the diagonal length of the effective plane of the electronic image pickup device, and SF is a shape factor for the negative lens component in the front lens group.

14 Claims, 14 Drawing Sheets

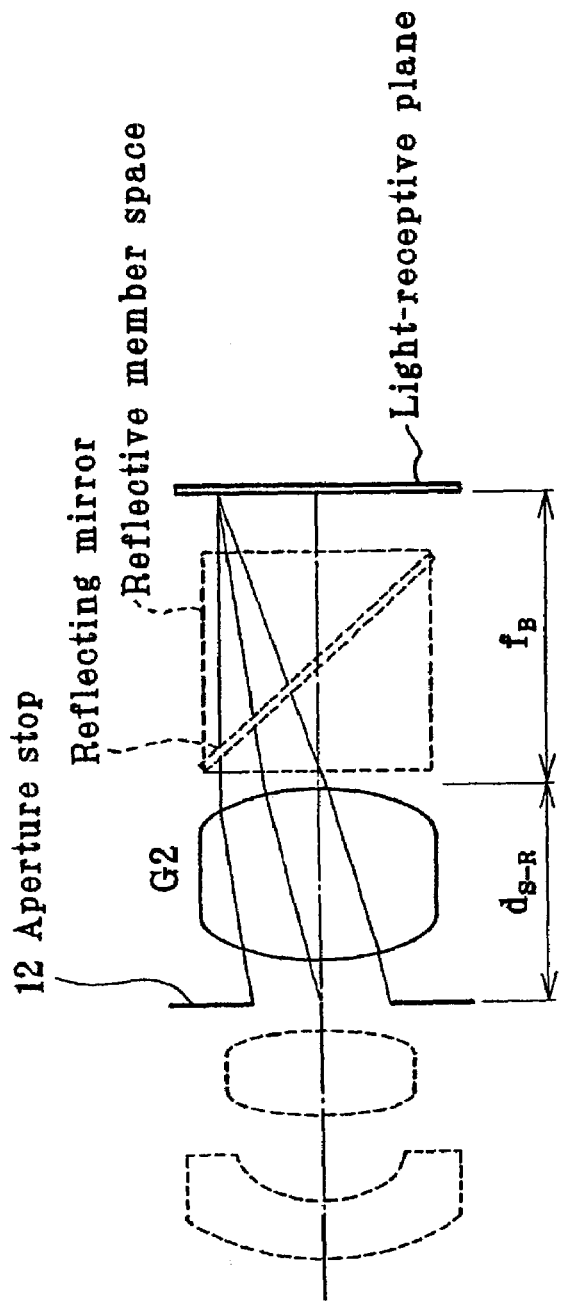
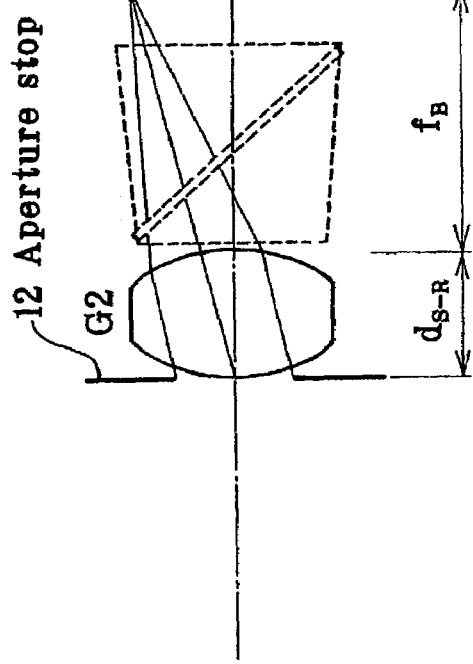
FIG. 15(a)
FIG. 15(b)

ELECTRONIC IMAGING SYSTEM

This application claims benefit of Japanese Application No. 2002-117777 filed in Japan on Apr. 19, 2002, the contents of which are incorporated herein by this reference.

BACKGROUND OF THE INVENTION

The present invention relates generally to an electronic imaging system represented by a video camera or still video camera, and more particularly to a wide-angle image pickup lens designed to reduce the size of such an electronic imaging system by use of a reflective member.

With the recent advent of miniature electronic image pickup devices such as CCDs, imaging units become smaller and smaller. Typically, JP-A 10-39207 shows an imaging unit in which a taking lens is made up of as few as four lens elements with a reduced length, and so only a lens portion is made compact.

JP-A 11-95096 discloses a taking lens made up of as few as four lens elements; however, this taking lens uses an aspheric lens and so costs much. The size of the taking lens itself is reduced by virtue of an image plane size reduction; as shown in FIG. 17, however, the presence of wires and terminals on the outer region of the light-receptive plane of an image pickup device 15 and the package size of the image pickup device 15 make it impossible to reduce size relative to the height direction. It is noted that FIG. 17 is illustrative in section of an imaging unit inclusive of its optical axis. Reference numeral 10 indicates a frame (lens barrel), 11 an image pickup lens, 12 an aperture stop, 13 an optical filter, 14 a cover glass and 15 an image pickup device. Regarding an objective lens for endoscopes, another approach to size reductions in the height direction has been proposed, wherein an optical path is bent to position an image pickup device laterally.

JP-A 9-122070 shows that an optical filter and a triangular prism are located at a back focus portion of a taking lens. However, this is not favorable for the total length of an imaging unit because of the need of a long bending space. Although constraints on the length of an endoscopic objective lens are loose, application of a long lens unit to a camera is not preferable because it means that camera thickness increases.

JP-A 11-109223 shows that a long back focus is ensured; however, the location of an aperture stop between a negative front lens group and a positive rear lens group causes rim rays at the rear lens group to become high, resulting in an increased lens diameter. Accordingly, when a reflective member is located at a back focus portion of this type, rays at the entrance surface of the reflective member become high, leading to the need of increasing the volume of the location where the reflective member is located.

SUMMARY OF THE INVENTION

In view of such problems with the prior art as described above, the primary object of the present invention is to provide an electronic imaging system and an image pickup optical system in which an electronic image pickup device is horizontally located to ensure the space needed for the location of a reflective member while height reductions, length reductions and cost reductions are all achieved.

According to the present invention, this object is attained by the provision of an electronic imaging system comprising a taking lens and an electronic image pickup device located on an image side thereof, characterized in that: the taking lens comprises a front lens group consisting of a negative lens component and a positive lens component and having positive refracting power and a rear lens group consisting of, in order from an object side thereof, a negative lens element and a positive lens element and having positive refracting power, with an aperture stop interposed between the front lens group and the rear lens group, and conditions (1) and (2) are satisfied.

$$2.8 < f_B/IH < 4.5 \quad (1)$$

$$2 < SF < 3 \quad (2)$$

Here $f_B$ is the length, as calculated on an air basis, of the back focus of the taking lens, IH is a length that is half the diagonal length of the effective plane of the electronic image pickup device, and SF is a shape factor $(R_F+R_R)/(R_F-R_R)$ for the negative lens component in the front lens group where $R_F$ and $R_R$ are the radii of curvature of the object side and image side of the negative lens component in the front lens group, respectively.

The advantages of, and the requirements for, the aforesaid arrangement are now explained.

To ensure a long back focus ($f_B$) for a taking lens, a retrofocus type comprising a front lens group of negative power and a rear lens group of positive power is commonly used. As shown in FIG. 14(a), however, a problem with the retrofocus type is that its overall length becomes too long with respect to its focal length. In FIGS. 14(a) to 14(e), the front and rear lens groups are indicated by G1 and G2, respectively. If the front lens group G1 is allowed to have positive refracting power as shown in FIG. 14(b), the overall length can then be cut down although $f_B$ becomes short. Here, if the rear lens group G2 is of the retrofocus type of −+ as shown in FIG. 14(c), $f_B$ can also be ensured. Thus, the taking lens of the present invention is made up of a front lens group consisting of a negative lens component and a positive lens component and a rear lens group consisting of a negative lens element and a positive lens element.

With rim rays in mind, the aperture stop must be interposed between the front lens group and the rear lens group, because the location of the aperture stop at the center of the optical system allows the diameters of the front and rear lens groups to be evenly cut down.

It is then necessary to satisfy conditions (1) and (2).

As the lower limit of 2.8 to condition (1) is not reached, any space for the location of the reflective member cannot be ensured and any bending layout cannot be achieved either. As the upper limit of 4.5 is exceeded, the front lens group cannot be constructed with positive power, and takes on a retrofocus type, resulting in an increase in the length of the optical system.

As the lower limit of 2 to condition (2) is not reached, large negative distortion occurs at the negative lens in the front lens group, and correction of that distortion at the positive lens in the front lens group becomes insufficient. As the upper limit of 3 is exceeded, the diverging effect of that negative lens becomes slender and the height of a rim light beam becomes high, resulting in an increase in lens diameter.

For the front lens group, it is desired that the negative lens and the positive lens be located in this order from its object side. With the negative lens located nearest to the object side of the front lens group, the desired wide-angle arrangement can be achieved while the diameter of the first lens is kept small.

It is noted that the electronic imaging system of the present invention should preferably satisfy the following condition (a) with respect to the maximum half taking angle of view ω.

$$20° < \omega < 35° \quad (a)$$

A maximum half taking angle of view that is lower than the lower limit of 20° to this condition (a) is not sufficient for the taking angle view used with imaging systems such as generally available cameras. As the upper limit of 35° is exceeded, it is difficult to make correction with a limited number of lenses for aberrations throughout a taking lens.

As the positive power of the front lens group is weak, the total length of the taking lens becomes long as shown in FIG. 14(d). Conversely, too strong power causes $f_B$ to become too short as shown in FIG. 14(e). It is thus desired to optimize the power of the front lens group; it is preferable to satisfy the following condition (3).

$$0.02 < f/f_1 < 0.50 \quad (3)$$

Here f is the focal length of the taking lens, and $f_1$ is the focal length of the front lens group.

As the lower limit of 0.02 to condition (3) is not reached, the taking lens becomes long and the power of the rear lens group becomes too strong; any good performance cannot be obtained with an arrangement comprising two spherical lenses. As the upper limit of 0.50 is exceeded, any long $f_B$ cannot be taken and the space for the reflective member cannot be ensured either.

When the reflective member (reflecting mirror) is located in the rear of the rear lens group as shown in FIGS. 15(a) and 15(b), the space for the reflective member may be saved by keeping the height of rays emerging the rear lens group G2 low (see FIG. 15(b)). Since the height of rays emerging from the rear lens group G2 is largely dependent on the position of the stop 12, the distance from the stop 12 to the exit surface of the rear lens group G2 should preferably be as short as possible. However, the positive lens in the rear lens group has strong power and so has a small radius of curvature. To add some edge to the positive lens, it is impossible to make the positive lens extremely thin. It is thus preferable to satisfy the following condition (4).

$$1.5 < f_B/d_{S-R} < 3 \quad (4)$$

Here $d_{S-R}$ is the axial length from the aperture stop to the final surface of the rear lens group.

As the lower limit of 1.5 to condition (4) is not reached, the diameter of the rear lens group becomes too large, leading to an increase in the volume of the location where the reflective member is placed. As the upper limit of 3 is exceeded, the length of the rear lens group arrangement becomes too long for the positive lens to have processible shape.

By the way, an electronic image pickup device requires an optical filter such as an infrared cut filter, and it is ordinarily interposed between a lens system and the image pickup device. As shown in FIG. 16(a), however, the location of a reflective member (reflecting mirror) 16 in the rear of a filter 13 causes the system to become long, and a long back focus must be provided to a lens 11. If, as shown in FIG. 16(b), the optical filter 13 is located on the object side with respect to an aperture stop 12, only the reflective member (reflecting mirror) 16 is located at a back focus portion so that the volume occupied by the lens 11 and an image pickup device 15 can be minimized. In FIG. 16(b), a flare stop 17 is located on the object side of the reflective member (reflecting mirror) 16.

It is noted that the optical filter 13, if interposed between the front lens group and the aperture stop as shown in FIG. 16(b), can be reduced in diameter and set up at a low cost.

For the reflective member, a prism and a mirror may be utilized; however, the prism is more expensive and heavier than the mirror. When the prism is used, a cover glass for the image pickup device comes close to the exit surface of the prism, resulting in the likelihood of ghosts between both planes. The use of the mirror as the reflective member makes cost reductions, weight reductions and prevention of ghosts possible. For the mirror, it is acceptable to use either a front surface mirror or a back-surface mirror defined by a plane-parallel plate.

In this connection, when the effective image pickup area of the electronic image pickup device is in a rectangular (oblong) form, the reflective member may be located in such a way that the entrance axis of the taking lens is substantially parallel with the long-side direction of that rectangular form. The taking lens having a long back focus according to the present invention enables such a layout to be easily achieved, leading to an increase in the degree of freedom in an imaging system layout.

Conversely, the reflective member may be located in such a way that the entrance axis of the taking lens is substantially parallel with the short-side direction of the rectangular form, thereby reducing the space where the reflective member is located.

The thickness of the electronic imaging system in the entrance axis direction may be increased with respect to the height or width direction of the electronic imaging system. With this arrangement applied to an electronic imaging system having a large thickness in the thickness direction, e.g., a camera, the size of the system in the height or width direction can be more reduced thereby slimming down the overall size of the system.

The reflective member should also preferably be located in such a way that the optical axis is bent in either one of the height and width directions, the length of which is shorter than that in the thickness direction, thereby making a contribution to reductions in the overall size of the system.

The electronic imaging system of the present invention may be designed such that the position of the taking portion for receiving the taking lens relative to its main body is variable, thereby slimming down the whole system and, hence, improving the portability of the system. With this arrangement, it is further possible to improve the capability of keeping hold of the system during taking.

For conditions (1) to (4), the upper and/or lower limits should preferably be set as follows, because the advantages described in connection therewith can be more enhanced.

In view of securing the space for the reflective member, the lower limit to condition (1) should be set at preferably 3.1 or more preferably either one of 3.22 and 3.31.

In view of reducing the length of the optical system, the upper limit to condition (1) should be set at preferably 4.0 or more preferably either one of 3.85 and 3.32.

In view of correction of aberrations, the lower limit to condition (2) should be set at preferably 2.2 or more preferably either one of 2.23 and 2.27.

In view of making lens diameter small, the upper limit to condition (2) should be set at preferably 2.5 or more preferably either one of 2.32 and 2.28.

In view of reducing the length of the optical system, the lower limit to condition (3) should be set at preferably 0.03 or more preferably either one of 0.04 and 0.13.

In view of securing the space for the reflective member, the upper limit to condition (3) should be set at preferably 0.4 or more preferably either one of 0.28 and 0.22.

In view of reducing the volume of the location for the reflective member, the lower limit to condition (4) should be set at preferably 1.8 or more preferably either one of 1.85 and 2.49.

In view of improvements in the processability of the rear lens group, the upper limit to condition (4) should be set at preferably 2.93 or more preferably either one of 2.68 and 2.49.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIGS. 15(a) and 15(b) are diagrams for showing the reflective member space in terms of rays emerging from the taking lens.

DESCRIPTION OF THE PREFERRED EMBODIMENTS

Examples 1 to 5 of the taking lens used with the electronic imaging system of the present invention are now explained. FIGS. 1(a), 2(a), 3(a), 4(a) and 5(a) are illustrative in section of Examples 1 to 5 upon focused on an infinite object point. In these figures, G1 stands for a front lens group, S an aperture stop, G2 a rear lens group, F an optical filter, and I an image plane. FIGS. 1(b), 2(b), 3(b), 4(b) and 5(b) are aberration diagrams for Examples 1 to 5. In these figures, "SA", "AS" and "DT" are representative of spherical aberrations, astigmatisms and distortions, respectively.

EXAMPLE 1

Figure 1A:
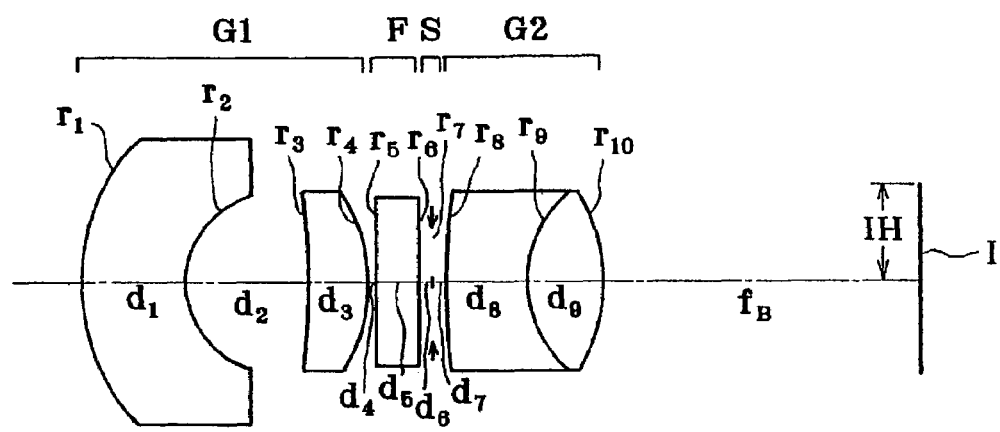
FIG. 1(a) is illustrative in section of Example 1 of the taking lens used with the electronic imaging system according to the present invention.
Figure 1B:
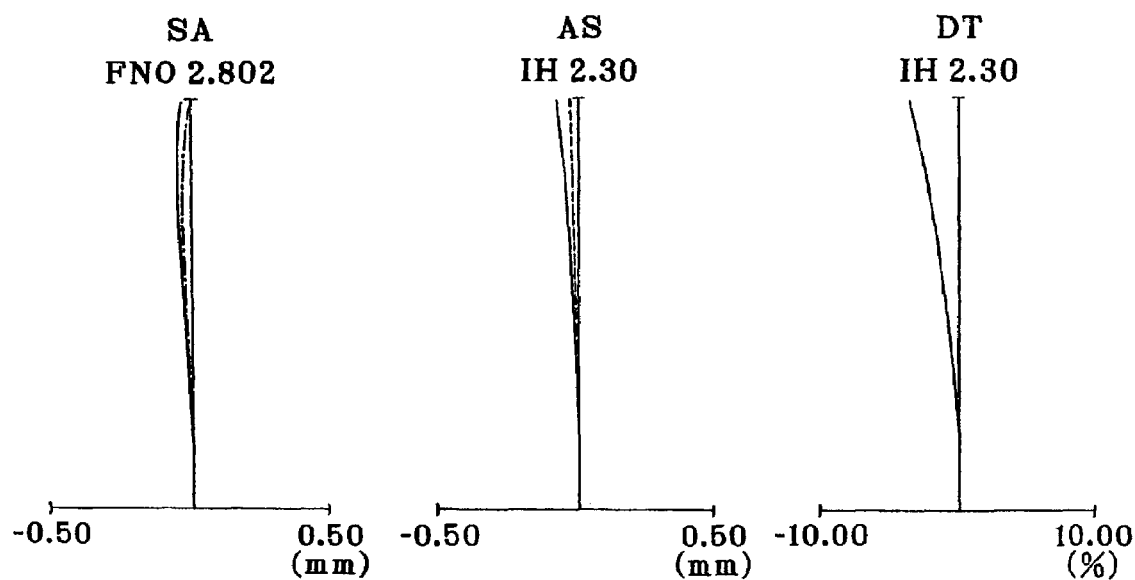
FIG. 1(b) is an aberration diagram for Example 1.

As shown in FIG. 1(a), this example is directed to a taking lens made up of a first lens group G1 composed of a negative meniscus lens deeply concave in its image-plane side and a positive meniscus lens steeply convex on its image side, an optical filter F for cutting infrared, an aperture stop S and a rear lens group G2 composed of a cemented positive lens consisting of a negative meniscus lens element deeply concave on its image side and a double-convex positive lens element.

In the instant example, the negative meniscus lens is used as the first lens, thereby keeping the diameter of the front lens small while achieving a wide-angle lens arrangement.

EXAMPLE 2

Figure 2A:
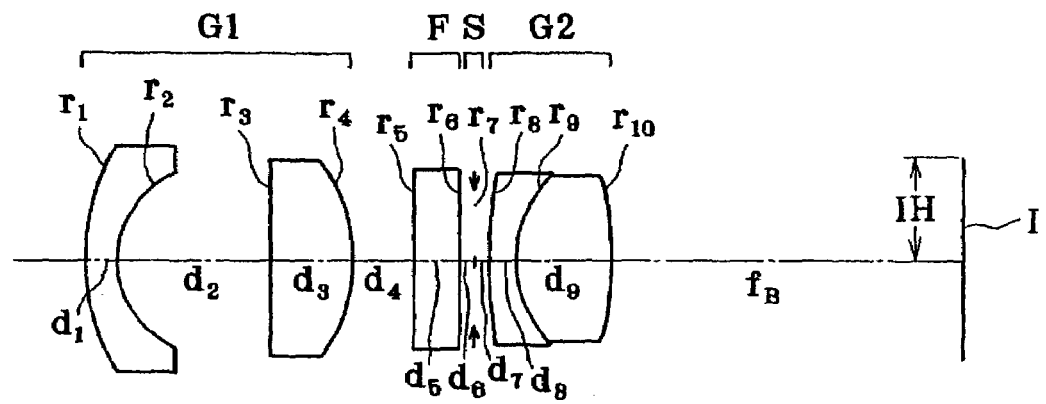
FIG. 2(a) is illustrative in section of Example 2 of the taking lens used with the electronic imaging system according to the present invention.
Figure 2B:
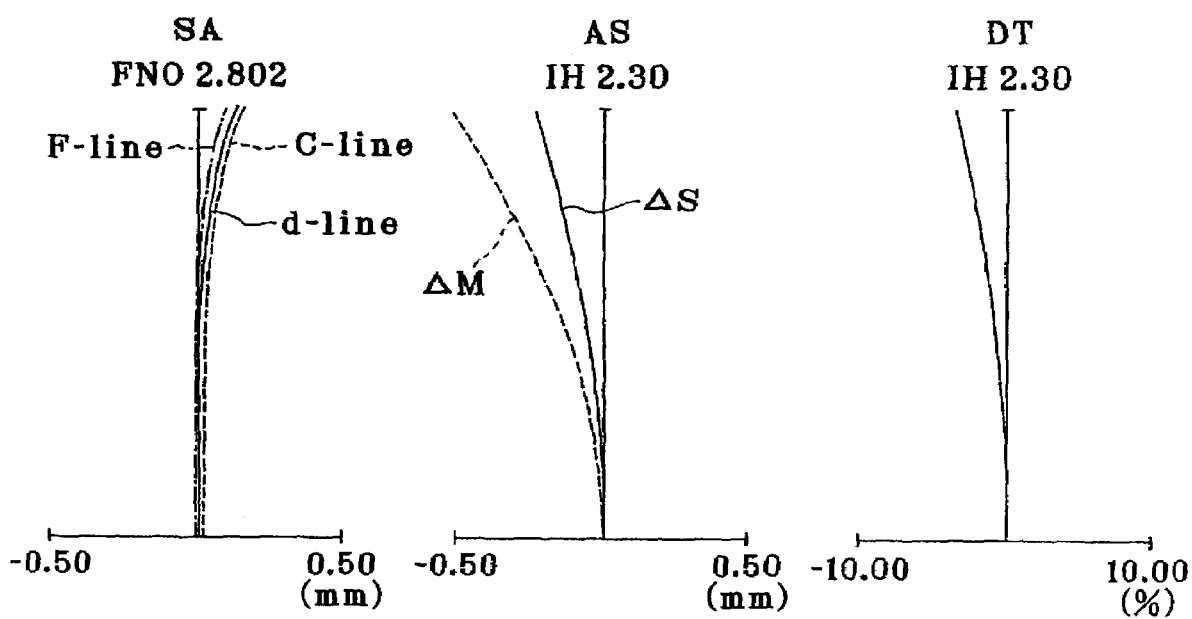
FIG. 2(b) is an aberration diagram for Example 2.

As shown in FIG. 2(a), this example is directed to a taking lens made up of a front lens group G1 composed of a negative meniscus lens deeply concave on its image-plane side and a positive meniscus lens steeply convex on its image side, an optical filter F for cutting infrared, an aperture stop S and a rear lens group G2 composed of a cemented positive lens consisting of a negative meniscus lens element deeply concave on its image side and a double-convex positive lens element.

In the instant example, the thin negative meniscus lens is used as the first lens, thereby achieving weight reductions.

EXAMPLE 3

Figure 3A:
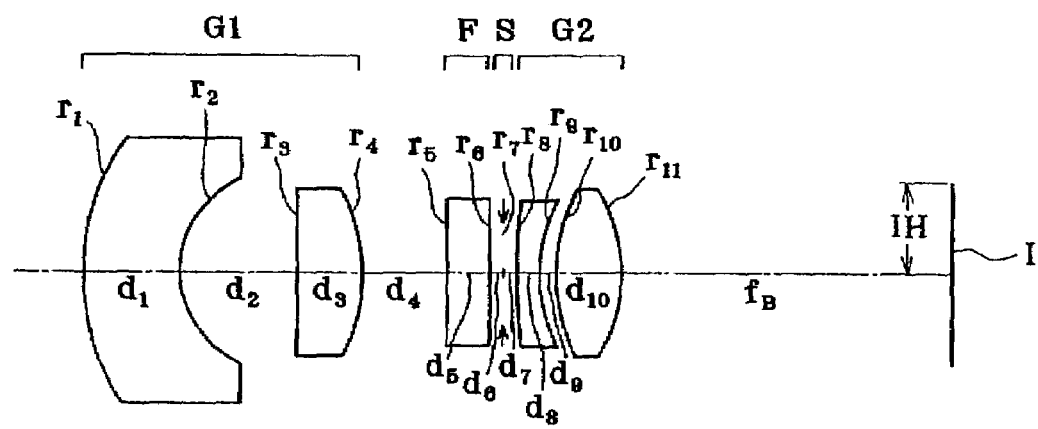
FIG. 3(a) is illustrative in section of Example 3 of the taking lens used with the electronic imaging system according to the present invention.
Figure 3B:
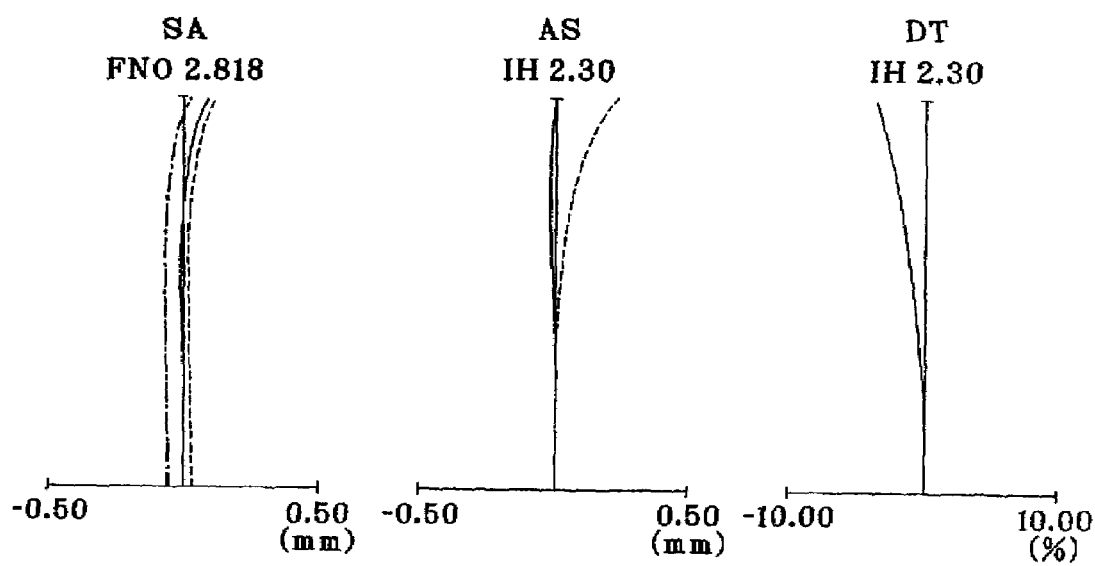
FIG. 3(b) is an aberration diagram for Example 3.

As shown in FIG. 3(a), this example is directed to a taking lens made up of a front lens group G1 composed of a negative meniscus lens deeply concave on its image-plane side and a double-convex positive lens steeply convex on its image side, an optical filter F for cutting infrared, an aperture stop S and a rear lens group G2 composed of a negative meniscus lens deeply concave on its image side and a double-convex positive lens.

EXAMPLE 4

Figure 4A:
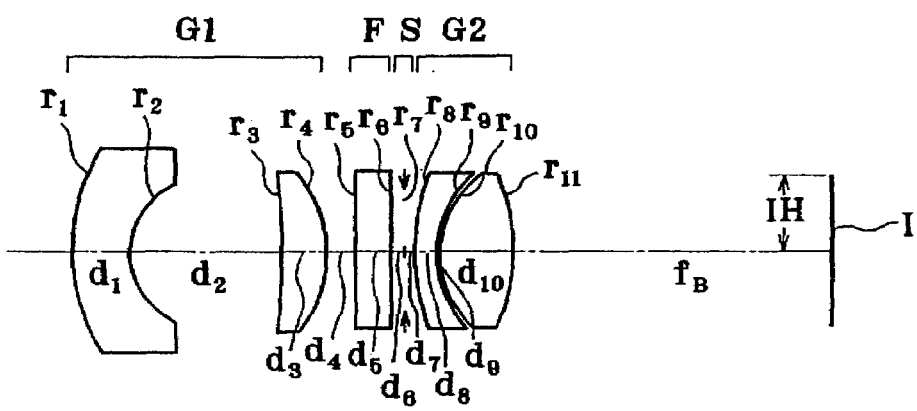
FIG. 4(a) is illustrative in section of Example 4 of the taking lens used with the electronic imaging system according to the present invention.
Figure 4B:
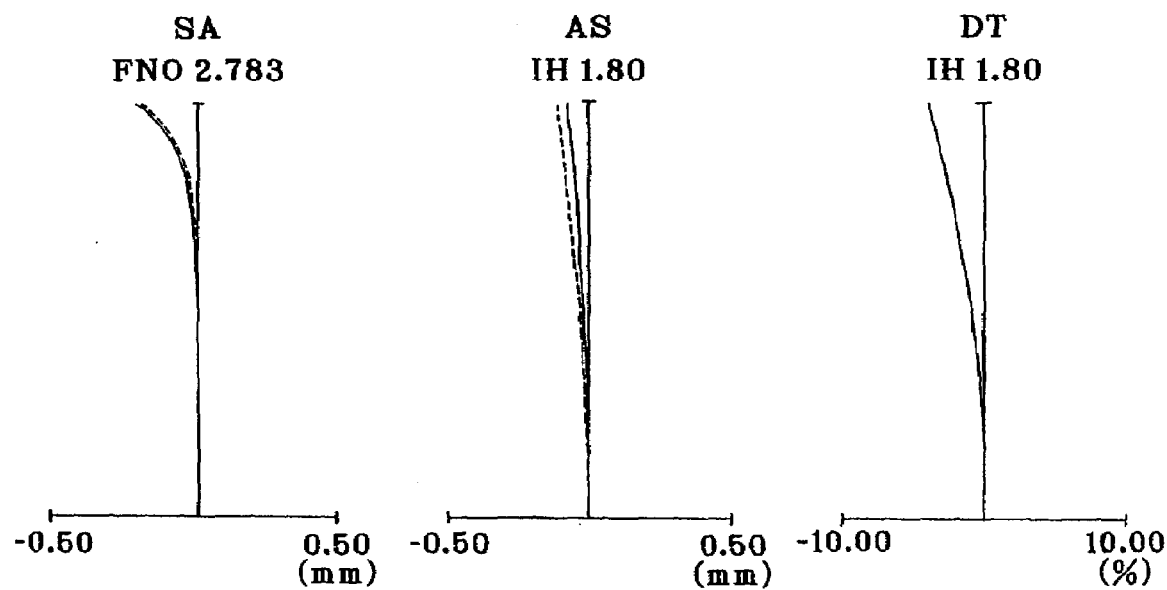
FIG. 4(b) is an aberration diagram for Example 4.

As shown in FIG. 4(a), this example is directed to a taking lens made up of a front lens group G1 composed of a negative meniscus lens deeply concave on its image-plane side and a positive meniscus lens steeply convex on its image side, an optical filter F for cutting infrared, an aperture stop S and a rear lens group G2 composed of a negative meniscus lens deeply concave on its image side and a double-convex positive lens.

EXAMPLE 5

Figure 5A:
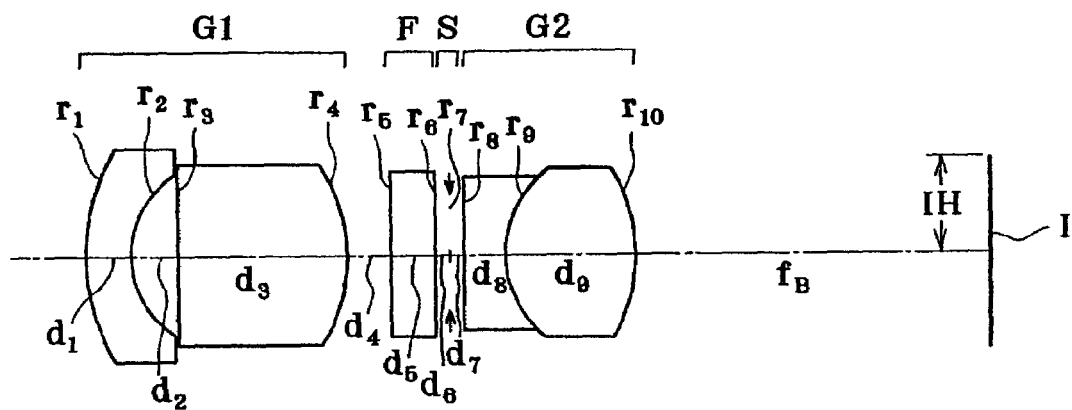
FIG. 5(a) is illustrative in section of Example 5 of the taking lens used with the electronic imaging system according to the present invention.
Figure 5B:
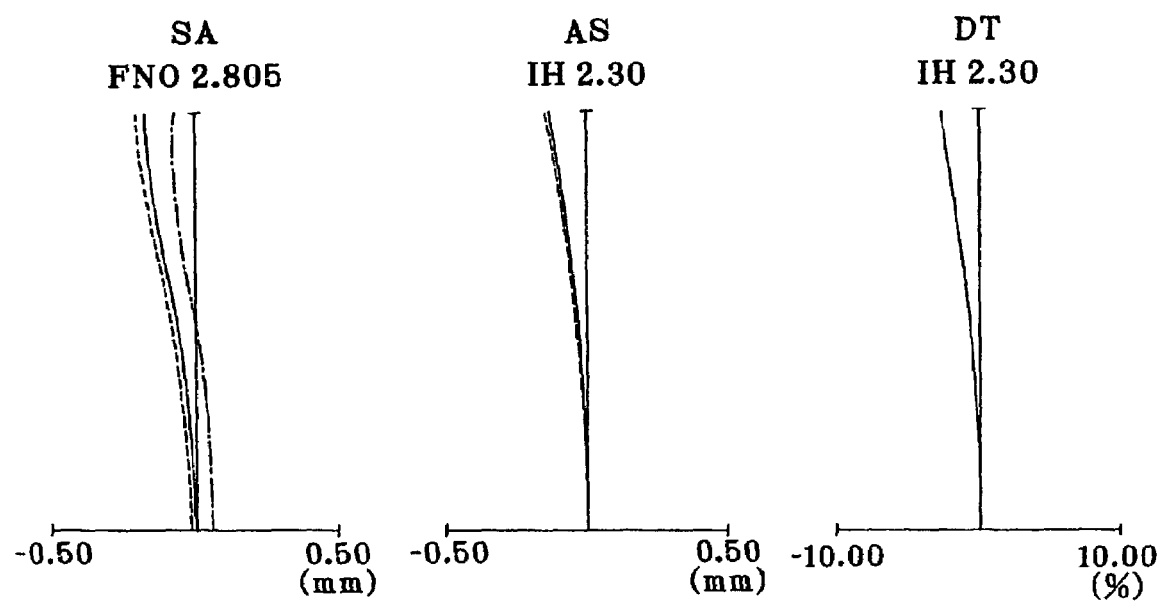
FIG. 5(b) is an aberration diagram for Example 5.

As shown in FIG. 5(a), this example is directed to a taking lens made up of a front lens group G1 composed of a negative meniscus lens deeply concave on its image-plane side and a thick planoconvex positive lens steeply convex on its image side, an optical filter F for cutting infrared, an aperture stop S and a rear lens group G2 composed of a cemented positive lens consisting of a planoconcave negative lens element deeply concave on its image side and a double-convex positive lens element.

In the instant example, the two lenses in the front lens group G1 are engaged at their planar portions with each other, thereby achieving improvements in assembly precision as well as efficiency of fabrication work.

Numerical data on the respective examples are given below. Symbols used hereinafter but not hereinbefore have the following meanings.

f: focal length of the taking lens,
$F_{NO}$: F-number,
ω: half angle of view,
IH: image height,
$r_1, r_2, \ldots$ : radius of curvature of each lens surface,
$d_1, d_2, \ldots$ : spacing between adjacent lens surfaces,
$n_{d1}, n_{d2}, \ldots$ : d-line refractive index of each lens, and
$\nu_{d1}, \nu_{d2}, \ldots$ : d-line based Abbe number of each lens.

EXAMPLE 1

| | | | | | | | |
|---|---|---|---|---|---|---|---|
| f | 5.32 | | | | | | |
| $F_{NO}$ | 2.80 | | | | | | |
| ω | 24.2° | | | | | | |
| IH | 2.30 | | | | | | |
| $f_B$ | 7.167 | | | | | | |
| $r_1 =$ | 5.591 | $d_1 =$ | 2.314 | $n_{d1} =$ | 1.77250 | $\nu_{d1} =$ | 49.60 |
| $r_2 =$ | 2.128 | $d_2 =$ | 2.645 | | | | |
| $r_3 =$ | −31.816 | $d_3 =$ | 1.405 | $n_{d2} =$ | 1.62004 | $\nu_{d2} =$ | 36.26 |
| $r_4 =$ | −4.551 | $d_4 =$ | 0.141 | | | | |
| $r_5 =$ | ∞ | $d_5 =$ | 1.000 | $n_{d3} =$ | 1.49782 | $\nu_{d3} =$ | 66.83 |
| $r_6 =$ | ∞ | $d_6 =$ | 0.300 | | | | |
| $r_7 =$ | ∞ (Stop) | $d_7 =$ | 0.300 | | | | |
| $r_8 =$ | 21.773 | $d_8 =$ | 1.868 | $n_{d4} =$ | 1.84666 | $\nu_{d4} =$ | 23.78 |
| $r_9 =$ | 2.928 | $d_9 =$ | 1.706 | $n_{d5} =$ | 1.67003 | $\nu_{d5} =$ | 47.23 |
| $r_{10} =$ | −4.366 | | | | | | |
| $f_B/IH$ | 3.116 | | | | | | |
| SF | 2.229 | | | | | | |
| $f/f_1$ | 0.039 | | | | | | |
| $f_B/d_{S-R}$ | 1.850 | | | | | | |

EXAMPLE 2

| | | | | | | | |
|---|---|---|---|---|---|---|---|
| f | 5.24 | | | | | | |
| $F_{NO}$ | 2.80 | | | | | | |
| ω | 24.5° | | | | | | |
| IH | 2.30 | | | | | | |
| $f_B$ | 7.410 | | | | | | |
| $r_1 =$ | 5.636 | $d_1 =$ | 0.713 | $n_{d1} =$ | 1.77250 | $\nu_{d1} =$ | 49.60 |
| $r_2 =$ | 2.237 | $d_2 =$ | 3.173 | | | | |
| $r_3 =$ | −101.818 | $d_3 =$ | 1.729 | $n_{d2} =$ | 1.62004 | $\nu_{d2} =$ | 36.26 |
| $r_4 =$ | −4.003 | $d_4 =$ | 1.332 | | | | |
| $r_5 =$ | ∞ | $d_5 =$ | 1.000 | $n_{d3} =$ | 1.49782 | $\nu_{d3} =$ | 66.83 |
| $r_6 =$ | ∞ | $d_6 =$ | 0.300 | | | | |
| $r_7 =$ | ∞ (Stop) | $d_7 =$ | 0.300 | | | | |
| $r_8 =$ | 13.366 | $d_8 =$ | 0.600 | $n_{d4} =$ | 1.84666 | $\nu_{d4} =$ | 23.78 |
| $r_9 =$ | 2.78 | $d_9 =$ | 2.069 | $n_{d5} =$ | 1.67003 | $\nu_{d5} =$ | 47.23 |
| $r_{10} =$ | −8.307 | | | | | | |
| $f_B/IH$ | 3.222 | | | | | | |
| SF | 2.316 | | | | | | |
| $f/f_1$ | 0.385 | | | | | | |
| $f_B/d_{S-R}$ | 2.496 | | | | | | |

EXAMPLE 3

| | | | | | | | |
|---|---|---|---|---|---|---|---|
| f | 5.54 | | | | | | |
| $F_{NO}$ | 2.82 | | | | | | |
| ω | 23.3° | | | | | | |
| IH | 2.30 | | | | | | |
| $f_B$ | 7.614 | | | | | | |
| $r_1 =$ | 6.559 | $d_1 =$ | 2.177 | $n_{d1} =$ | 1.77250 | $\nu_{d1} =$ | 49.60 |
| $r_2 =$ | 2.542 | $d_2 =$ | 2.698 | | | | |
| $r_3 =$ | 328.8 | $d_3 =$ | 1.516 | $n_{d2} =$ | 1.62004 | $\nu_{d2} =$ | 36.26 |
| $r_4 =$ | −5.193 | $d_4 =$ | 1.954 | | | | |
| $r_5 =$ | ∞ | $d_5 =$ | 1.000 | $n_{d3} =$ | 1.49782 | $\nu_{d3} =$ | 66.83 |
| $r_6 =$ | ∞ | $d_6 =$ | 0.300 | | | | |
| $r_7 =$ | ∞ (Stop) | $d_7 =$ | 0.300 | | | | |
| $r_8 =$ | 15.038 | $d_8 =$ | 0.600 | $n_{d4} =$ | 1.84666 | $\nu_{d4} =$ | 23.78 |
| $r_9 =$ | 3.494 | $d_9 =$ | 0.400 | | | | |
| $r_{10} =$ | 5.095 | $d_{10} =$ | 1.540 | $n_{d5} =$ | 1.67003 | $\nu_{d5} =$ | 47.23 |
| $r_{11} =$ | −4.329 | | | | | | |
| $f_B/IH$ | 3.311 | | | | | | |
| SF | 2.266 | | | | | | |
| $f/f_1$ | 0.131 | | | | | | |
| $f_B/d_{S-R}$ | 2.681 | | | | | | |

EXAMPLE 4

| | | | | | | | |
|---|---|---|---|---|---|---|---|
| f | 4.75 | | | | | | |
| $F_{NO}$ | 2.78 | | | | | | |
| ω | 21.5° | | | | | | |
| IH | 1.80 | | | | | | |
| $f_B$ | 6.873 | | | | | | |
| $r_1 =$ | 4.556 | $d_1 =$ | 1.276 | $n_{d1} =$ | 1.77250 | $\nu_{d1} =$ | 49.60 |
| $r_2 =$ | 1.809 | $d_2 =$ | 3.257 | | | | |
| $r_3 =$ | −30.16 | $d_3 =$ | 0.914 | $n_{d2} =$ | 1.62004 | $\nu_{d2} =$ | 36.26 |
| $r_4 =$ | −3.519 | $d_4 =$ | 0.695 | | | | |
| $r_5 =$ | ∞ | $d_5 =$ | 0.800 | $n_{d3} =$ | 1.49782 | $\nu_{d3} =$ | 66.83 |
| $r_6 =$ | ∞ | $d_6 =$ | 0.240 | | | | |
| $r_7 =$ | ∞ (Stop) | $d_7 =$ | 0.240 | | | | |
| $r_8 =$ | 6.463 | $d_8 =$ | 0.480 | $n_{d4} =$ | 1.84666 | $\nu_{d4} =$ | 23.78 |
| $r_9 =$ | 2.458 | $d_9 =$ | 0.057 | | | | |
| $r_{10} =$ | 2.379 | $d_{10} =$ | 1.576 | $n_{d5} =$ | 1.51633 | $\nu_{d5} =$ | 64.14 |
| $r_{11} =$ | −5.579 | | | | | | |
| $f_B/IH$ | 3.818 | | | | | | |
| SF | 2.317 | | | | | | |
| $f/f_1$ | 0.280 | | | | | | |
| $f_B/d_{S-R}$ | 2.921 | | | | | | |

EXAMPLE 5

| | | | | | | | |
|---|---|---|---|---|---|---|---|
| f | 5.03 | | | | | | |
| $F_{NO}$ | 2.81 | | | | | | |
| ω | 25.2° | | | | | | |
| IH | 2.30 | | | | | | |
| $f_B$ | 7.643 | | | | | | |
| $r_1 =$ | 5.836 | $d_1 =$ | 0.900 | $n_{d1} =$ | 1.77250 | $v_{d1} =$ | 49.60 |
| $r_2 =$ | 2.273 | $d_2 =$ | 1.000 | | | | |
| $r_3 =$ | ∞ | $d_3 =$ | 3.800 | $n_{d2} =$ | 1.62004 | $v_{d2} =$ | 36.26 |
| $r_4 =$ | −4.201 | $d_4 =$ | 0.940 | | | | |
| $r_5 =$ | ∞ | $d_5 =$ | 1.000 | $n_{d3} =$ | 1.49782 | $v_{d3} =$ | 66.83 |
| $r_6 =$ | ∞ | $d_6 =$ | 0.300 | | | | |
| $r_7 =$ | ∞ (Stop) | $d_7 =$ | 0.300 | | | | |
| $r_8 =$ | ∞ | $d_8 =$ | 0.900 | $n_{d4} =$ | 1.84666 | $v_{d4} =$ | 23.78 |
| $r_9 =$ | 2.645 | $d_9 =$ | 2.900 | $n_{d5} =$ | 1.67003 | $v_{d5} =$ | 47.23 |
| $r_{10} =$ | −4.07 | | | | | | |
| $f_B/IH$ | 3.323 | | | | | | |
| SF | 2.276 | | | | | | |
| $f/f_1$ | 0.222 | | | | | | |
| $f_B/d_{S-R}$ | 1.864 | | | | | | |

Figure 6:
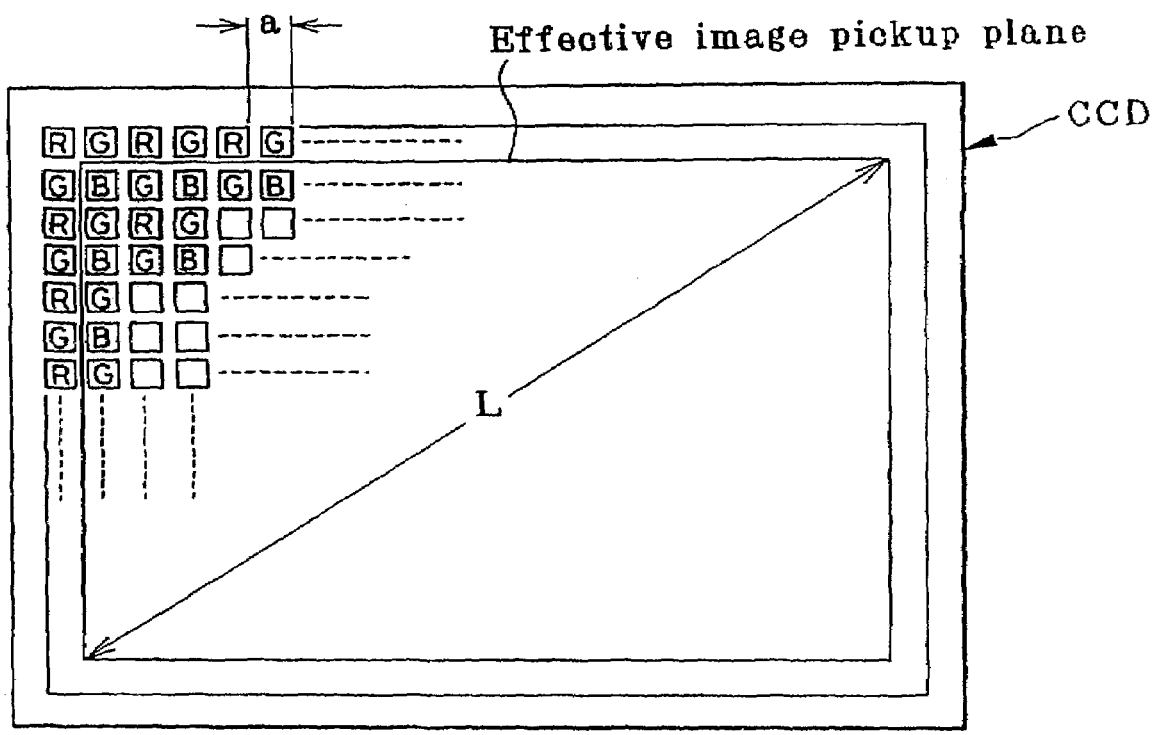
FIG. 6 is illustrative of the diagonal length of the effective image pickup plane of an electronic image pickup device.

Here the "IH" used herein is now explained. The "IH" represents a length that is half the diagonal length of an effective plane of the electronic image pickup device. FIG. 6 is illustrative of the diagonal length of the effective image pickup plane of an electronic image pickup device. The "effective image pickup plane" used herein is understood to mean a certain area in the photoelectric conversion surface on an image pickup device used for the reproduction of a phototaken image (on a personal computer or by a printer). The effective image pickup plane shown in FIG. 6 is set at an area narrower than the total photoelectric conversion surface on the image pickup device (CCD or CMOS), depending on the performance of the optical system used (an image circle that can be ensured by the performance of the optical system). The diagonal length L of an effective image pickup plane, i.e., the diagonal length L of the effective plane is thus defined by that of the effective image pickup plane. Although the image pickup range used for image reproduction may be variable, it is noted that when the taking lens of the present invention is used on an imaging system having such functions, the diagonal length L of its effective image pickup plane varies. In that case, the diagonal length L of the effective image pickup plane according to the present invention is defined by the maximum value in the possible widest range for L. FIG. 6 is illustrative of one exemplary pixel array for the electronic image pickup device, wherein R (red), G (green) and B (blue) pixels or four pixels, i.e., cyan, magenta, yellow and green (G) pixels are mosaically arranged at a pixel spacing a.

The present image pickup lens constructed as described above may be applied to electronic phototaking systems where object images formed through image pickup lenses are received at image pickup devices such as CCDs for photo-taking purposes, inter alia, digital cameras or video cameras as well as portable telephones. Given below are some such embodiments.

Figure 7:
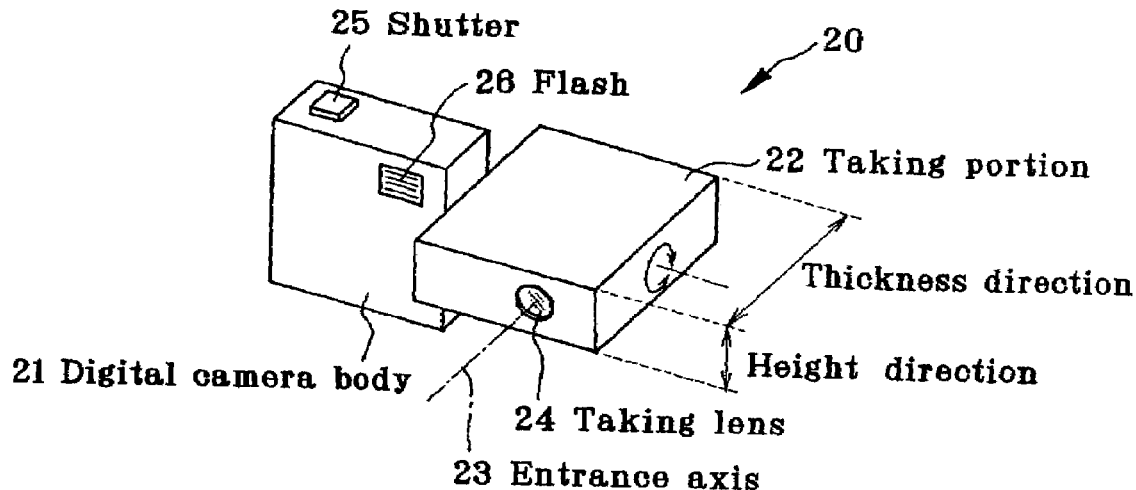
FIG. 7 is a front perspective view of the outside shape of a digital camera in which the taking lens of the present invention is built.
Figure 8:
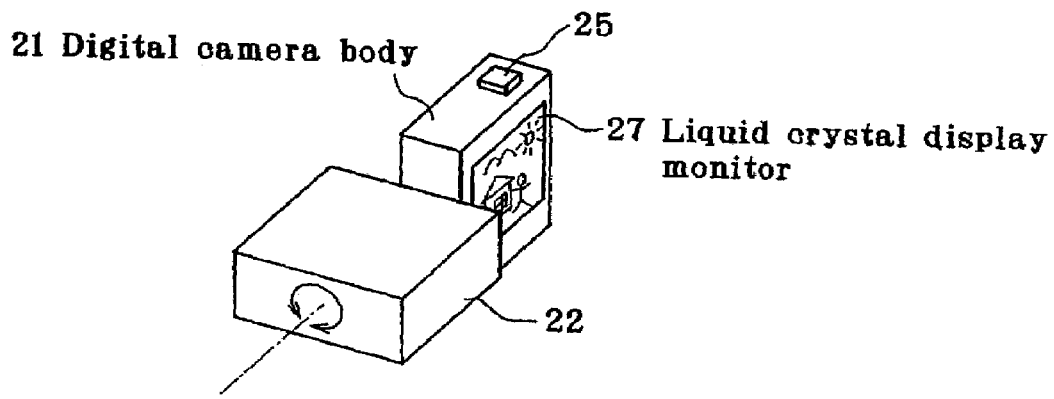
FIG. 8 is a rear perspective view of the FIG. 7 digital camera.
Figure 9:
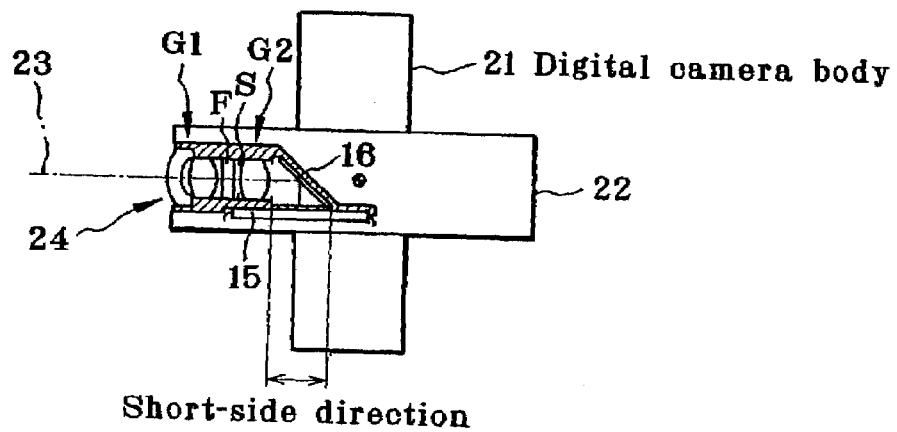
FIG. 9 is a partly cut-away side view of the FIG. 7 digital camera.

FIGS. 7, 8 and 9 are conceptual illustrations of a digital camera, in which the image pickup lens of the present invention is built. FIG. 7 is a front perspective view of the outside shape of a digital camera 20, and FIG. 8 is a rear perspective view of the same. FIG. 9 is a partly cut-away side view of the construction of the digital camera 20. In this embodiment, the digital camera 20 is built up of a digital camera body 21 and a taking portion 22 wherein, indicated by a double arrow, the taking portion 22 is mounted on the camera body 21 in a vari-angle fashion. At the taking portion 22, a taking lens 24 of the present invention including an entrance axis 23 is located together with a reflective member (reflecting mirror) 16 and an image pickup device (CCD) 15. At the camera body 21, a shutter 25, a flash 26, a liquid crystal display monitor 27, etc. are located. As the shutter 25 mounted on the upper portion of the camera body 21 is pressed down while a subject indicated on the liquid crystal display monitor 27 is viewed, phototaking takes place through the taking lens 24 at the taking portion 22, for instance, the taking lens according to Example 1. In this case, the angle of the camera body 21 with the taking portion 22 is freely settable. Although not shown, a finder may or may not be located at the taking portion 22.

In this embodiment, the reflective member 16 is located in such a way that the short-side direction of the image pickup device 15 positioned at the image pickup plane of the taking lens 24 at the taking portion 22 is substantially parallel with the entrance axis 23, so that the space for receiving the reflecting member 16 can be cut down.

The thickness of the taking portion 22 in the direction of the entrance axis 23 is so large relative to the height direction that the size of the system in the height direction can be more reduced to slim down the system.

In this embodiment, a shaft and other parts for the vari-angle mechanism may be located in a space on the back of the opposite surface, which is created by holding the image pickup device 15 back with respect to the entrance axis 23, thereby increasing the degree of freedom in the layout of the whole electronic imaging system.

Figure 10:
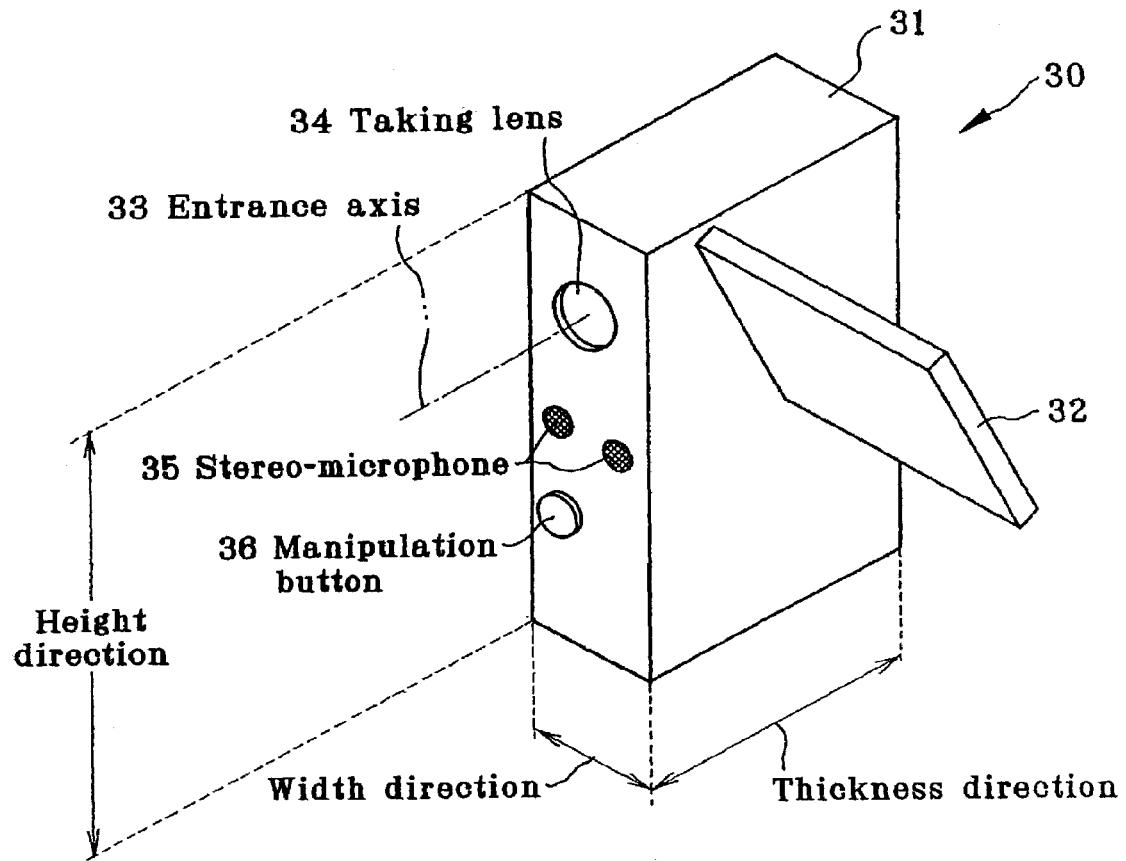
FIG. 10 is a front perspective view of the outside shape of a video camera in which the taking lens of the present invention is built.
Figure 11:
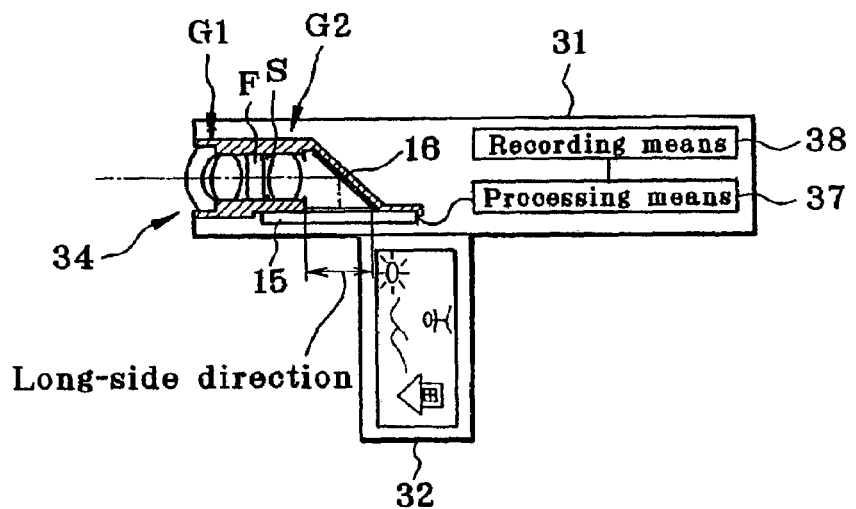
FIG. 11 is a partly cut-away top view of the FIG. 10 video camera.

FIGS. 10 and 11 are conceptual illustrations of a video camera in which the taking lens of the present invention is built. FIG. 10 is a front perspective view of the outside shape of a video camera 30, and FIG. 11 is a partly cut-away top view of that video camera 30. In this embodiment, the video camera 30 is built up of a video camera body 31, and a liquid crystal display monitor 32 that is collapsible with respect to the camera body 31 during carrying and mounted at a controllable angle (in a vari-angle fashion). Within the camera body 31, a taking lens 34 having an entrance axis 33 according to the present invention is located together with a reflective member (reflecting mirror) 16 and an image pickup device (CCD) 15, and processing means 37 for processing signals of a phototaken image and recording means 38 for recording such signals are incorporated. On the camera body 31, a manipulation button 36 for manipulating the video camera 30, a stereo-microphone 35 for capturing sounds, etc. are provided. As the manipulation button 36 is manipulated while a subject indicated on the liquid crystal display monitor 32 is viewed, phototaking occurs through the taking lens 34, e.g., the taking lens according to Example 1, and signals of a phototaken image are recorded in the recording means 38 via the processing means 37. In this case, the angle of the liquid crystal display monitor 32 with the camera 31 is freely settable. Although not shown, a finder may or may not be located.

In this embodiment, the reflective member 16 is located in such a way that the long-side direction of the image pickup device 15 positioned at the image pickup plane of the taking lens 34 is substantially parallel with an entrance axis 33, so that the degree of freedom in the layout of the imaging system can be increased.

The thickness of the system in the direction of the entrance axis 33 is so large relative to the width direction that the size of the system in the width direction can be more reduced to slim down the system.

Figure 12A:
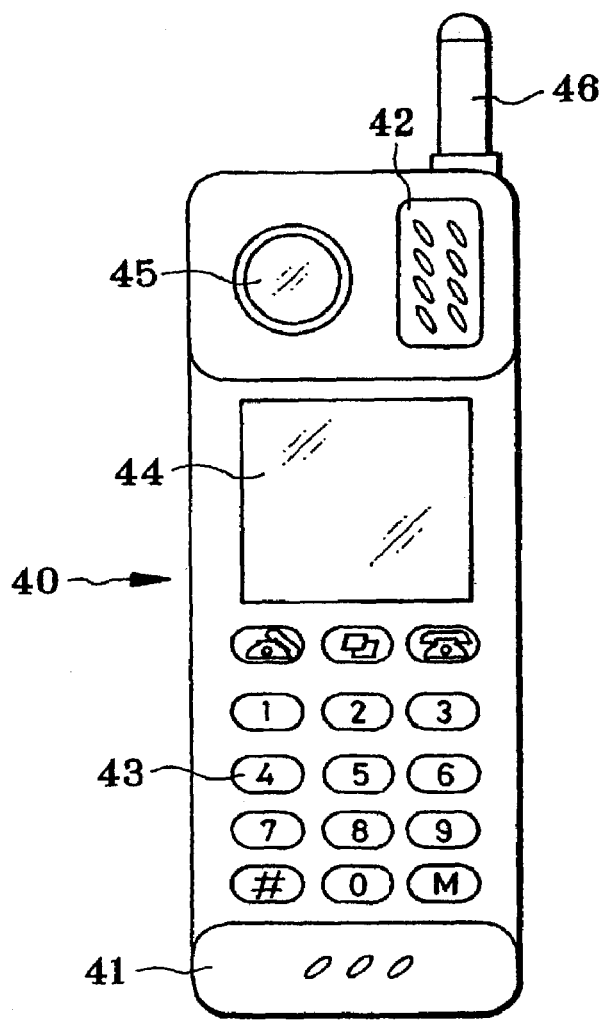
FIGS. 12(a) and 12(b) are a front and a side view of a cellular phone in which the taking lens of the present invention is built.
Figure 12B:
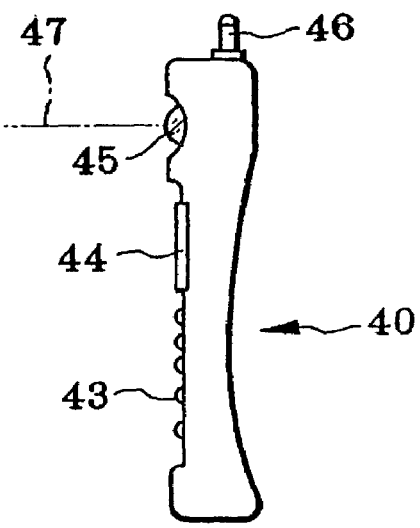
Figure 12C:
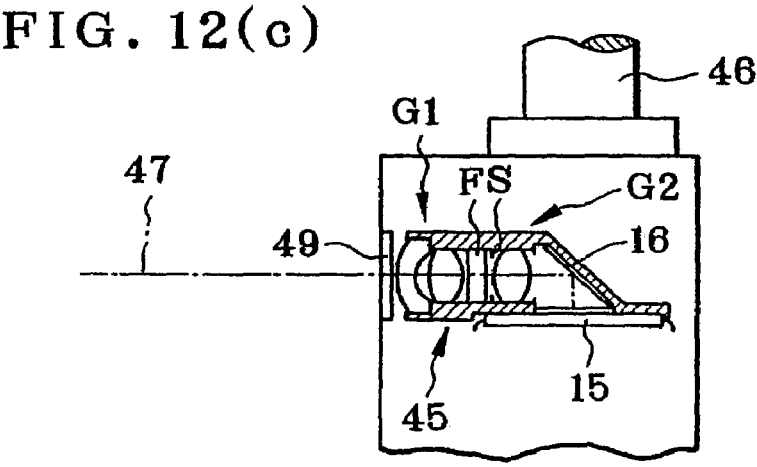
FIG. 12(c) is a sectional view of a phototaking optical system for the same.

FIGS. 12(a), 12(b) and 12(c) are illustrative of a telephone set that is one example of the information processor in which the taking lens of the present invention is built in the form of a phototaking optical system, especially a convenient-to-carry cellular phone. FIG. 12(a) and FIG. 12(b) are a front and a side view of a cellular phone 40, respectively, and FIG. 12(c) is a sectional view of a phototaking optical system 45. As shown in FIGS. 12(a), 12(b) and 12(c), the cellular phone 40 comprises a microphone 41 for entering the voice of an operator therein as information, a speaker 42 for producing the voice of the person on the other end, an input dial 43 via which the operator enters information therein, a monitor 44 for displaying an image taken of the operator or the person on the other end and indicating information such as telephone numbers, a phototaking optical system 45, an antenna 46 for transmitting and receiving communication waves, and processing means (not shown) for processing image information, communication information, input signals, etc. Here the monitor 44 is a liquid crystal display device. It is noted that the components are not necessarily arranged as shown. The phototaking optical system 45 comprises on a phototaking optical path 47 the taking lens according to the present invention, e.g., the taking lens according to Example 1 as well as a reflective member (reflecting mirror) 16 and an image pickup device (CCD or C-MOS) 15. These components are built in the cellular phone 40. The phototaking optical system 45 is provided at its end with a cover glass 49 for protecting the taking lens.

An object image received at the image pickup device 15 is entered via a terminal of the image pickup device 15 in processing means (not shown), so that the object image can be displayed as an electronic image on the monitor 44 and/or a monitor at the other end. The processing means also include a signal processing function for converting information about the object image received at the image pickup device 15 into transmittable signals, thereby sending the image to the person at the other end.

Figure 13A:
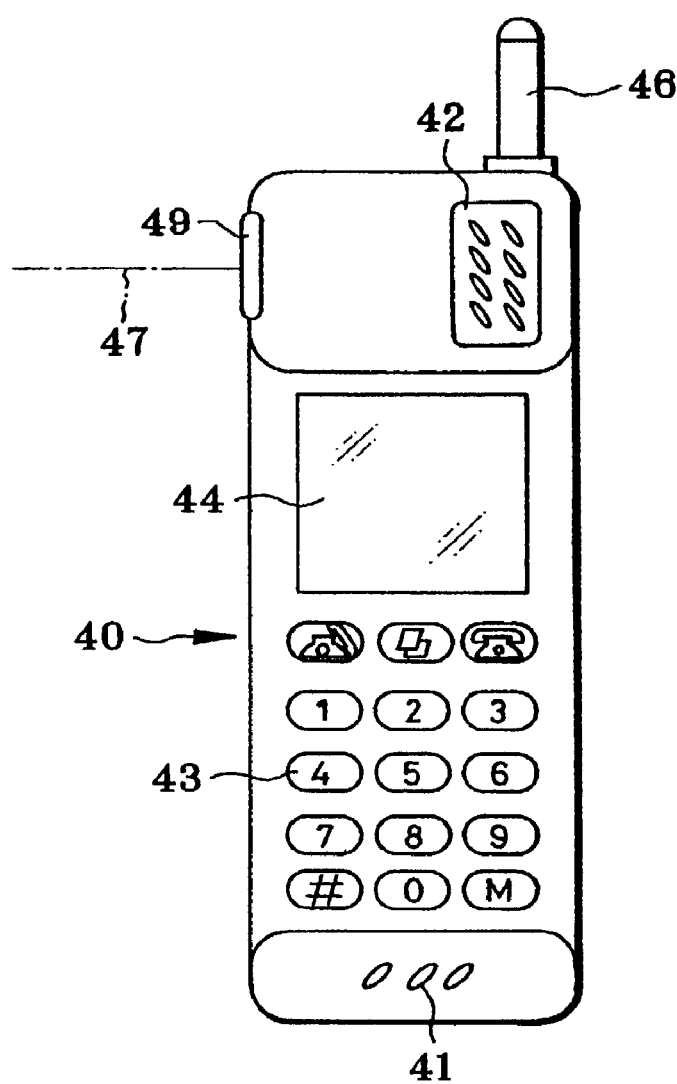
FIGS. 13(a), 13(b) and 13(c) are a front, a side and a sectional view of a modification to the cellular phone in which the taking lens of the present invention is built.
Figure 13B:
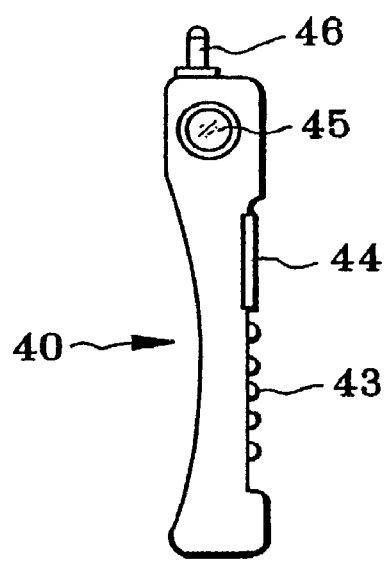
Figure 13C:
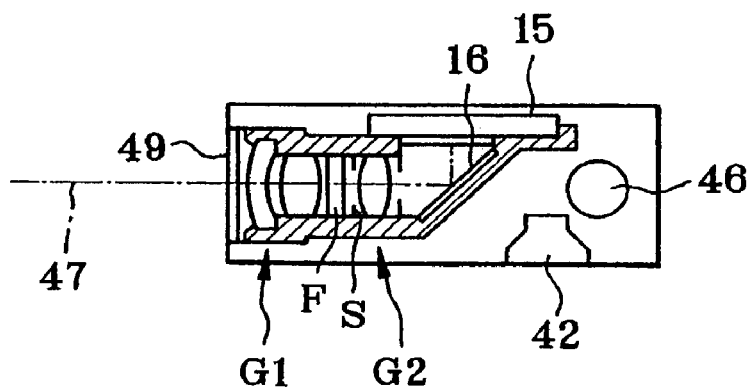
Figure 14A:
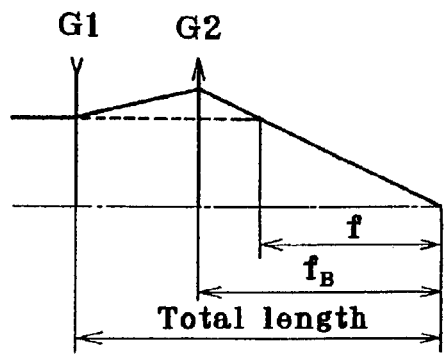
FIGS. 14(a), 14(b), 14(c), 14(d) and 14(e) are diagrams for the paraxial arrangements of the taking lens according to the present invention.
Figure 14B:
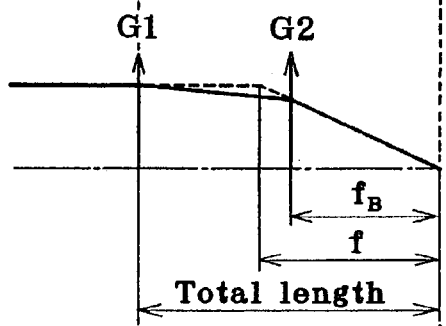
Figure 14C:
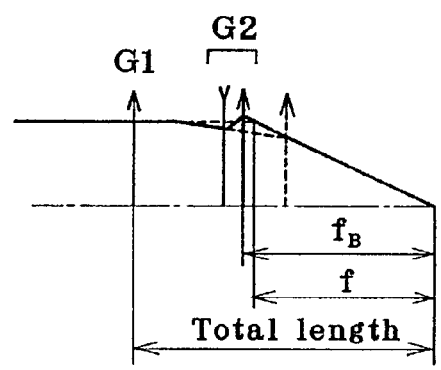
Figure 14D:
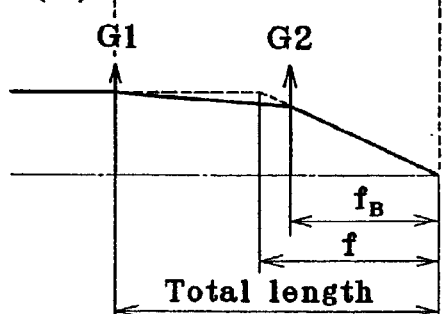
Figure 14E:
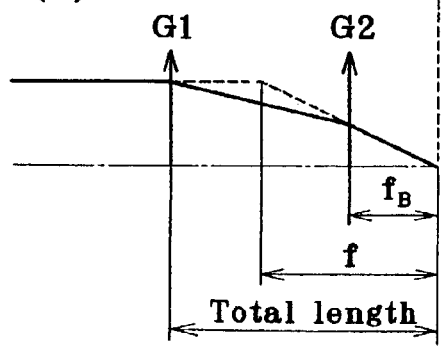
Figure 16A:
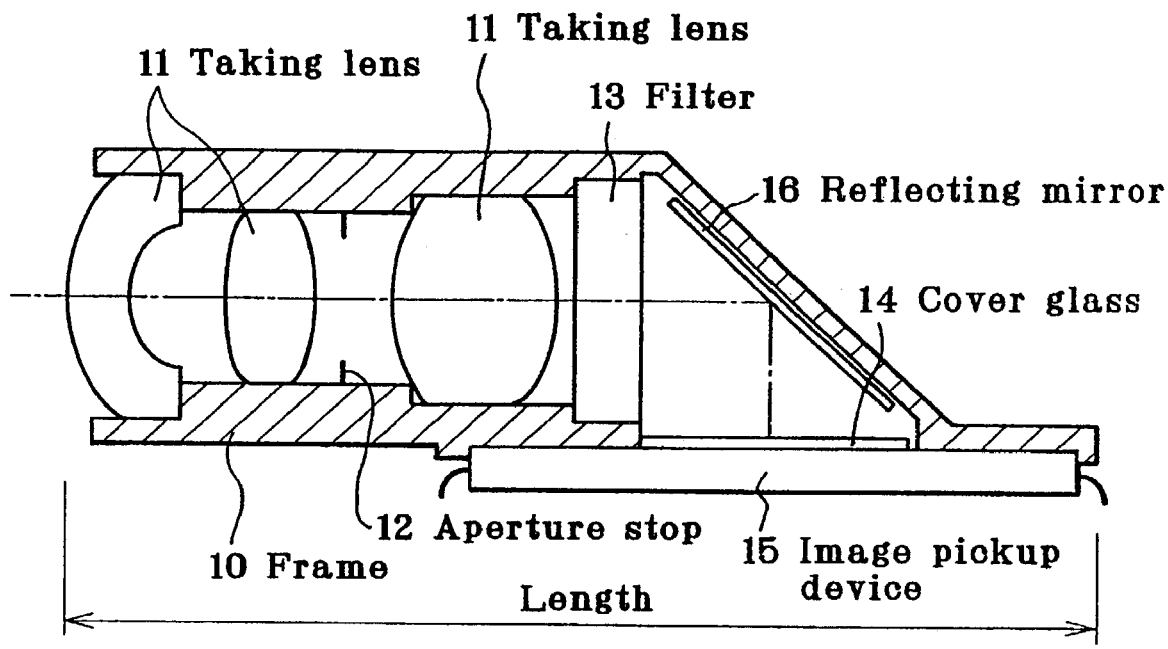
FIGS. 16(a) and 16(b) are diagrams for how an optical filter is located according to the present invention.
Figure 16B:
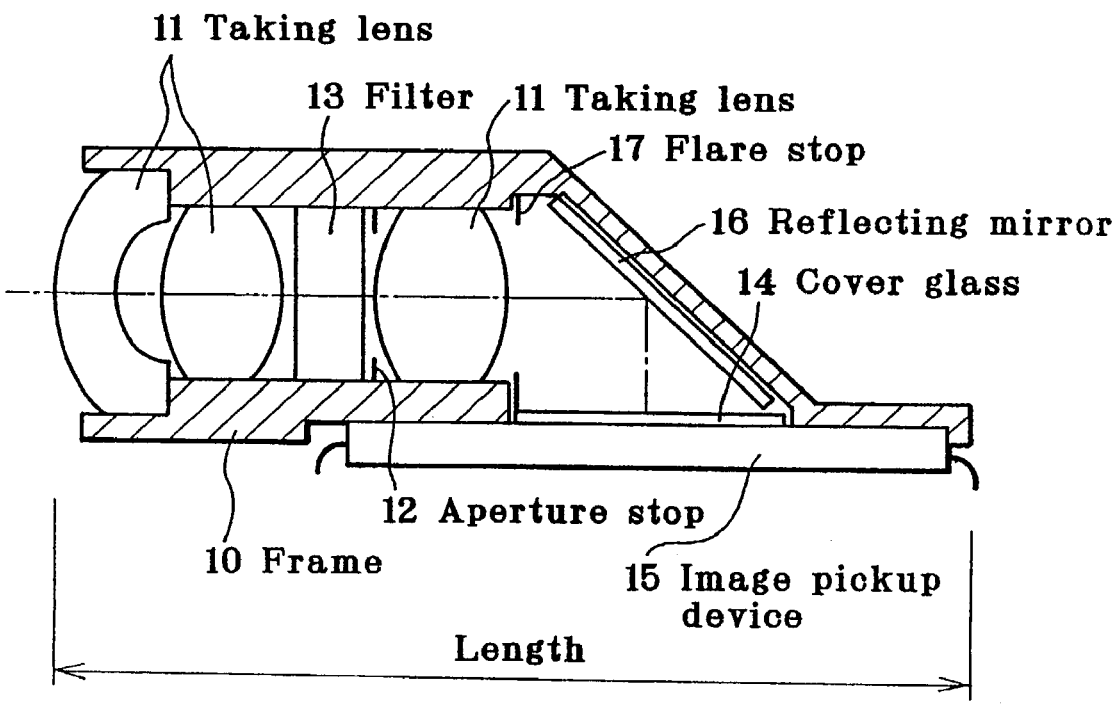
Figure 17:
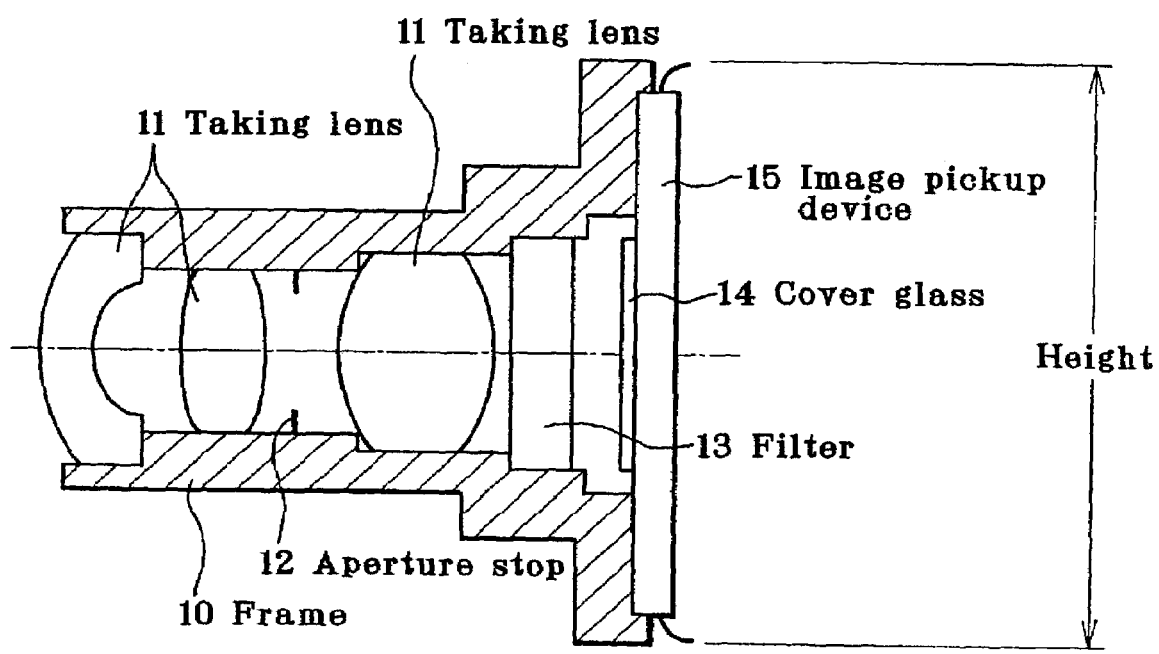
FIG. 17 is a diagram for showing that simple size reductions of the image plane impose a certain limitation on size reductions of an imaging unit.

In accordance with the arrangement shown in FIGS. 12(a), 12(b) and 12(c), the size of the cellular phone in the height direction can be reduced. A specific layout for reducing the size of the cellular phone in the thickness direction, on the other hand, is shown in FIGS. 13(a), 13(b) and 13(c) that are a front, a side and a sectional view of a modification to the cellular phone 40, respectively. This cellular phone works as shown in FIGS. 12(a), 12(b) and 12(c) excepting what is described below.

In this embodiment, a light beam is incident on the side of the cellular phone 40, and an optical path is bent by a reflective member (reflecting mirror) 16 in the thickness direction of the cellular phone 40. In this way, the cellular phone 40 having a phototaking function can be slimmed down. This embodiment provides an additional favorable layout because an antenna 46 is located at a space on the back of the reflecting surface 16.

As can be understood from the foregoing, the present invention can provide an electronic imaging system and an image pickup optical system in which an electronic image pickup device is horizontally located to ensure the space needed for the location of a reflective member while height reductions, length reductions and cost reductions are all achieved.

I claim:

1. An electronic imaging system comprising a taking lens and an electronic image pickup device located on an image side thereof, wherein:

the taking lens comprises a front lens group consisting of a negative lens component and a positive lens component and having positive refracting power and a rear lens group consisting of, in order from an object side thereof, a negative lens element and a positive lens element and having positive refracting power, with an aperture stop interposed between the front lens group and the rear lens group, and conditions (1) and (2) are satisfied:

$$2.8 < f_B/IH < 4.5 \quad (1)$$

$$2 < SF < 3 \quad (2)$$

where $f_B$ is a length, as calculated on an air basis, of a back focus of the taking lens, IH is a length that is half a diagonal length of an effective plane of the electronic image pickup device, and SF is a shape factor $(R_F+R_R)/(R_F-R_R)$ for the negative lens component in the front lens group where $R_F$ and $R_R$ are radii of curvature of the object side and image side of the negative lens component in the front lens group, respectively.

2. The electronic imaging system according to claim 1, wherein the front lens group comprises, in order from an object side thereof, the negative lens component and the positive lens component.

3. The electronic imaging system according to claim 1, which satisfies condition (a) with respect to a maximum taking half angle of view ω:

$$20° < \omega < 35° \quad (a).$$

4. The electronic imaging system according to claim 1, which satisfies condition (3):

$$0.02 < f/f_1 < 0.50 \quad (3)$$

where f is a focal length of the taking lens, and $f_1$ is a focal length of the front lens group.

5. The electronic imaging system according to claim 1, which satisfies condition (4):

$$1.5 < f_B/d_{S-R} < 3 \quad (4)$$

where $d_{S-R}$ is an axial length from the aperture stop to a final surface of the rear lens group.

6. The electronic imaging system according to claim 1, wherein an optical filter is located on an object side with respect to the aperture stop.

7. The electronic imaging system according to claim 6, wherein the optical filter is interposed between the front lens group and the aperture stop.

8. The electronic imaging system according to claim 1, wherein a reflective member is interposed between the rear lens group and the electronic image pickup device.

9. The electronic imaging system according to claim 8, wherein the reflective member is a reflecting mirror.

10. The electronic imaging system according to claim 8, wherein the electronic image pickup device has an effective image pickup area in a rectangular form, and the reflective member is located in such a way that an entrance axis of the taking lens is substantially parallel with a long-side direction of the rectangular form.

11. The electronic imaging system according to claim 8, wherein the electronic image pickup device has an effective image pickup area in a rectangular form, and the reflective member is located in such a way that an entrance axis of the taking lens is substantially parallel with a short-side direction of the rectangular form.

12. The electronic imaging system according to claim 8, wherein a thickness of the electronic imaging system in an entrance axis direction thereof is larger than that of the electronic imaging system in a height or width direction thereof.

13. The electronic imaging system according to claim 12, wherein the reflective member is located in such a way that an optical axis is bent in either one of the height and width directions, the length of which is shorter than that in the thickness direction.

14. The electronic imaging system according to claim 1, wherein a position of a taking portion for receiving the taking lens relative to a main body of the electronic imaging system is variable.

* * * * *